US011454579B2

(12) United States Patent
Takeda

(10) Patent No.: US 11,454,579 B2
(45) Date of Patent: Sep. 27, 2022

(54) BASE MATERIAL EVALUATION METHOD AND CURVED GLASS EVALUATION DEVICE

(71) Applicant: AGC Inc., Chiyoda-ku (JP)

(72) Inventor: Yosuke Takeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 661 days.

(21) Appl. No.: 16/419,686

(22) Filed: May 22, 2019

(65) Prior Publication Data

US 2019/0271623 A1    Sep. 5, 2019

Related U.S. Application Data

(63) Continuation of application No. PCT/JP2017/041666, filed on Nov. 20, 2017.

(30) Foreign Application Priority Data

Nov. 25, 2016 (JP) .............................. JP2016-229439

(51) Int. Cl.
*G01N 3/56* (2006.01)
*G01N 13/00* (2006.01)
*G01N 21/59* (2006.01)

(52) U.S. Cl.
CPC .............. *G01N 3/56* (2013.01); *G01N 13/00* (2013.01); *G01N 21/59* (2013.01)

(58) Field of Classification Search
CPC ............ G01N 3/56; G01N 3/20; G01N 13/00; G01N 21/59; G01N 2203/023; G01N 2203/04; G01N 2203/0417; G01N 2203/0411; G01N 33/386
USPC .................................. 73/849, 852, 853, 854
See application file for complete search history.

(56) References Cited

FOREIGN PATENT DOCUMENTS

| CN | 105716944 A | * | 6/2016 |
|----|-------------|---|--------|
| CN | 105716944 A |   | 6/2016 |
| JP | 2-71249 U   |   | 5/1990 |
| JP | 11014724 A  |   | 1/1999 |
| JP | 2003-295131 |   | 10/2003 |
| JP | 2007-192632 |   | 8/2007 |
| JP | 3204577 U   |   | 6/2016 |

OTHER PUBLICATIONS

International Search Report dated Jan. 16, 2018 in PCT/JP2017/041666 filed Nov. 20, 2017.
Written Opinion dated Jan. 16, 2018 in PCT/JP2017/041666 filed Nov. 20, 2017.

* cited by examiner

*Primary Examiner* — Nathaniel J Kolb

(74) *Attorney, Agent, or Firm* — Oblon, McClelland, Maier & Neustadt, L.L.P.

(57) ABSTRACT

A method for evaluating a base material includes deforming a base material. The base material includes a bent portion, and includes a first main surface, a second main surface, and an end surface to change a curvature of the bent portion. The method further includes evaluating a surface state of the first main surface of the base material.

12 Claims, 3 Drawing Sheets

BASE MATERIAL EVALUATION METHOD AND CURVED GLASS EVALUATION DEVICE

TECHNICAL FIELD

The present invention relates to a method for evaluating a base material and a bent glass evaluation apparatus.

BACKGROUND ART

Conventionally, tests are conducted on objects such as fibers, leather, and lenses to test durability of the surfaces of the objects such as wear resistance and scratch resistance (e.g., see Patent Document 1). For example, wear resistance evaluations are made by bringing an abrading head such as fabrics or steel wool into contact with objects such as lenses, and making relative motions between the objects and the abrading head.

Flat base materials, convex base materials having a low and almost constant curvature such as the lens indicated in Patent Document 1, or base materials having high flexibility such as fibers and leather as indicated in Patent Documents 2 and 3 are used as the objects.

Meanwhile, base materials of low flexibility including a high-curvature bent portion have been widely used recently. For example, glass having a bent portion is used as cover glass for a touch panel display. Because users touch cover glass, the surface of the cover glass is required to have wear resistance or the like, and thus, it is necessary to make wear resistance evaluations or the like.

CITATION LIST

Patent Literature

Patent Document 1: JP-A-2003-295131
Patent Document 2: JP-UM-A-H02-71249
Patent Document 3: Japanese Utility Model No. 3204577

SUMMARY OF THE INVENTION

Technical Problem

In conventional wear resistance evaluations made on glass of low flexibility including a bent portion, an abrading head cannot be uniformly brought into contact with glass including a high-curvature bent portion because the glass has low flexibility. For this reason, wear resistance evaluations of uniform quality cannot be made under certain test conditions or within the range of certain test conditions.

An object of the present invention is to provide a method for evaluating a base material and a bent glass evaluation apparatus, with which evaluations or tests such as wear resistance evaluations can be made uniformly in quality even on base materials of low flexibility including a high-curvature bent portion.

Solution to Problem (1) A method for evaluating a base material, comprising:
deforming a base material including a bent portion, and including a first main surface, a second main surface, and an end surface to change a curvature of the bent portion; and
evaluating a surface state of the first main surface of the base material.

In the present invention, tests or measurements of the surface state of the first main surface of the base material can be made uniformly in quality with precision because the bent portion is deformed into a shape for evaluation when making an evaluation of the base material including the bent portion as an initial shape.

(2) The method for evaluating a base material according to (1), wherein the bent portion of the base material has a curvature R1 that is larger than a curvature R2 of the bent portion of the base material deformed.

In the embodiment of the present invention, because the base material including the bent portion having the curvature R1 in the initial shape can be deformed into the shape for evaluation so as to have the curvature R2 that is lower than the curvature R1, test methods or measurement methods when making an evaluation on a flat base material can be easily used, and thus, an evaluation can be made uniformly in quality with precision.

(3) The method for evaluating a base material according to (1) or (2), wherein in deforming the base material, a difference is given between a pressure P1 on a first main surface side of the base material and a pressure P2 on a second main surface side of the base material.

In the embodiment of the present invention, the pressure difference allows the base material to be easily deformed into the shape for evaluation.

(4) The method for evaluating a base material according to any one of (1) to (3), wherein in deforming the base material, the base material is placed on a pedestal with the second main surface being in contact with the pedestal, and a negative pressure is supplied to a second main surface side of the base material.

In the embodiment of the present invention, providing equipment capable of supplying a negative pressure to the second main surface side of the base material allows the base material to be easily deformed into the shape for evaluation.

(5) The method for evaluating a base material according to (4), wherein the following relationship is satisfied:

$$|r3-r2|=t$$

wherein r3 is a curvature radius of a bent portion of a placing surface of the pedestal, r2 is a curvature radius of the bent portion having a curvature R2 in the base material deformed, and t is a thickness of the base material.

In the embodiment of the present invention, because the base material can be laid along the shape of the placing surface to be deformed from the initial shape into the shape for evaluation having a lower curvature to be fixed, a stable evaluation of the base material can be made.

(6) The method for evaluating a base material according to (1) or (2), wherein in deforming the base material, the base material is sandwiched by a first jig disposed on a first main surface side of the base material and a second jig disposed on a second main surface side of the base material.

In the embodiment of the present invention, because the base material is sandwiched by the first jig and the second jig, the base material can be stably deformed to be fixed.

(7) The method for evaluating a base material according to (6), wherein the base material is sandwiched between a surface of the first jig and a surface of the second jig, and the first jig includes an opening portion from which the first main surface is exposed.

In the embodiment of the present invention, because the first jig includes the opening portion from which the first main surface of the base material is exposed, it is possible to make an evaluation of the first main surface while deforming the base material into the shape for evaluation.

(8) The method for evaluating a base material according to (6) or (7), wherein the first jig and the second jig are connected with each other by a connecting member, and the base material is deformed.

In the embodiment of the present invention, connecting the first jig and the second jig by the connecting jig and adjusting the clamping degree of the connecting member allow the base material to be deformed from the initial shape into a desired shape for evaluation, and allow the deformed base material to be held stably.

(9) The method for evaluating a base material according to (8), wherein the following relationship is satisfied:

$$|r3-r2|=t$$

wherein r3 is a curvature radius of a bent portion of a placing surface of the second jig, r2 is a curvature radius of the bent portion having a curvature R2 in the base material deformed, and t is a thickness of the base material.

In the embodiment of the present invention, because the base material can be laid along the shape of the placing surface to be deformed from the initial shape into the shape for evaluation having a lower curvature to be fixed, a stable evaluation of the base material can be made.

(10) The method for evaluating a base material according to any one of (1) to (9), wherein the evaluation of the surface state is a wear resistance evaluation.

In the embodiment of the present invention, the base material can be deformed from the initial shape into the shape for evaluation to be fixed, which makes it easier to make a wear resistance evaluation, and can achieve an evaluation with precision.

(11) The method for evaluating a base material according to any one of (1) to (9), wherein the evaluation of the surface state is a liquid interface evaluation.

In the embodiment of the present invention, the base material can be deformed from the initial shape into the shape for evaluation to be fixed, which can achieve a liquid interface evaluation with small errors and high precision.

(12) The method for evaluating a base material according to any one of (1) to (9), wherein the evaluation of the surface state is an optical characteristic evaluation.

In the embodiment of the present invention, the base material can be deformed from the initial shape into the shape for evaluation to be fixed, which can minimize an optical influence by the bend of the base material, and can achieve an evaluation with precision.

(13) A bent glass evaluation apparatus comprising a fixing mechanism configured to change a curvature of a bent portion of a glass, the glass including the bent portion, and including a first main surface, a second main surface, and an end surface.

In the present invention, the apparatus which can deform the bent portion into a shape for evaluation when making an evaluation on a base material including the bent portion as an initial shape can be provided, whereby tests or measurements can be made uniformly in quality with precision.

(14) The bent glass evaluation apparatus according to (13), wherein the fixing mechanism includes a first jig disposed on a first main surface side of the glass and a second jig disposed on a second main surface side of the glass.

In the embodiment of the present invention, because the base material is sandwiched by the first jig and the second jig, the base material can be stably deformed to be fixed.

(15) The bent glass evaluation apparatus according to (14), wherein the first jig includes an opening portion from which the first main surface is to be exposed.

In the embodiment of the present invention, because the first jig includes the opening portion from which the first main surface of the base material is exposed, it is possible to make an evaluation of the first main surface while deforming the base material into the shape for evaluation.

Advantageous Effects of Invention

In the present invention, a method for evaluating a base material and a bent glass evaluation apparatus, which can make tests such as durability tests uniformly in quality even on base materials of low flexibility including a high-curvature bent portion, can be provided.

BRIEF DESCRIPTION OF DRAWINGS

FIG. 2A shows a bent plate having a shape including a bent portion and a flat portion, and FIG. 2B shows a bent plate having a shape including a bent portion over the entire bent plate.

DESCRIPTION OF EMBODIMENTS

Hereinafter, descriptions of embodiments of a method for evaluating a base material in the present invention are provided in detail with reference to the drawings while taking a wear resistance evaluation test as an example. The present invention is not limited to the embodiments because the present invention can be carried out in different manners.

[Wear Resistance Evaluation Apparatus]

Figure 1:
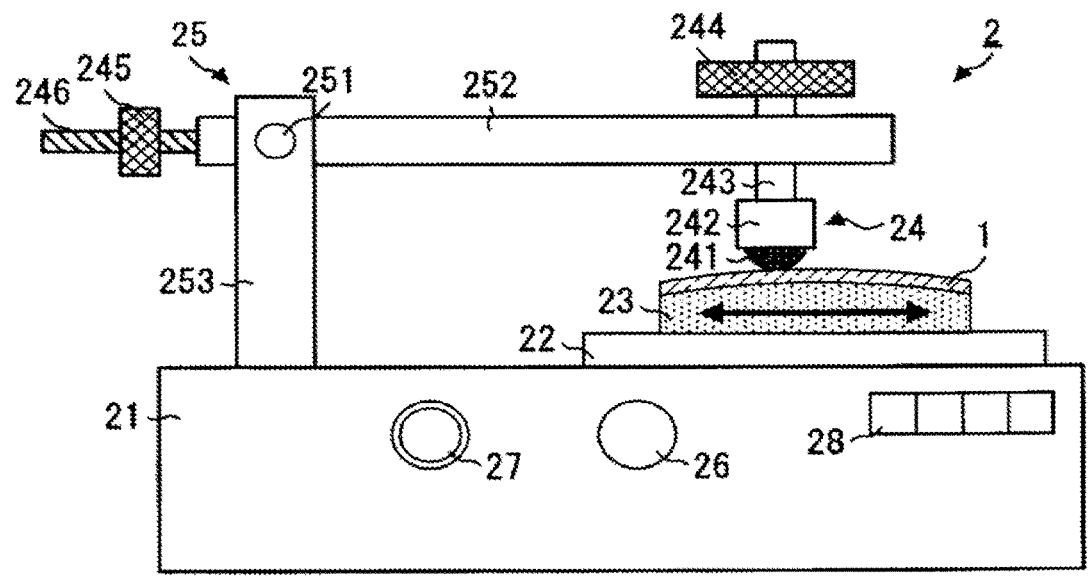
FIG. 1 is a side perspective view of a base material evaluation apparatus as one example.

FIG. 1 is a side perspective view of a wear resistance evaluation apparatus 2, which is used as a base material evaluation apparatus. The wear resistance evaluation apparatus 2 includes a body frame 21, a horizontal reciprocating device 22, a placing table 23, a friction jig 24, and a supporting member 25.

The horizontal reciprocating device 22, the placing table 23, the supporting member 25, a speed adjusting switch 26, a power switch 27, a counter 28, a control device (not shown), a motor (not shown), and the like are disposed on the body frame 21.

The horizontal reciprocating device 22 has its one end connected to the placing table 23 and the other end connected to the motor or the like, and makes the placing table 23 horizontally reciprocate in accordance with the movement of the motor. When the power switch 27 is turned on, the control device sends control signals to the motor to control the number of times of the reciprocation of the placing table 23. At this time, the number of times of the reciprocation is displayed on the counter 28, and the reciprocation is stopped when the number of times of the reciprocation reaches the set number. The speed of the reciprocation can be arbitrarily adjusted with the use of the speed adjusting switch 26. In addition, changing a cam or the like for bringing the horizontal reciprocating device 22 into operation allows any setting of the stroke of the reciprocation.

In the present description, while the horizontal reciprocating device 22 is described as a mechanism for moving the placing table 23 on which the base material 1 placed with respect to the friction jig 24 in a horizontal direction, it is not limited particularly as long as the friction jig 24 and the placing table 23 reciprocate relatively.

An arm 252 has its one end connected to a shaft 251 so as to be movable around a column 253 and has the other end connected to the friction jig 24.

The friction jig 24 includes an abrading head 241, a fixing tool 242, and a regulating rod 243, and the abrading head 241 is fixed by the fixing tool 242.

The abrading head 241 is not limited particularly as long as the abrading head 241 is an abrading object to be used in wear resistance tests. For example, fabrics such as gauze, calico, and clothing for garments, metals such as steel wool, and resins such as an eraser can be used as the abrading head 241.

Figure 3A:
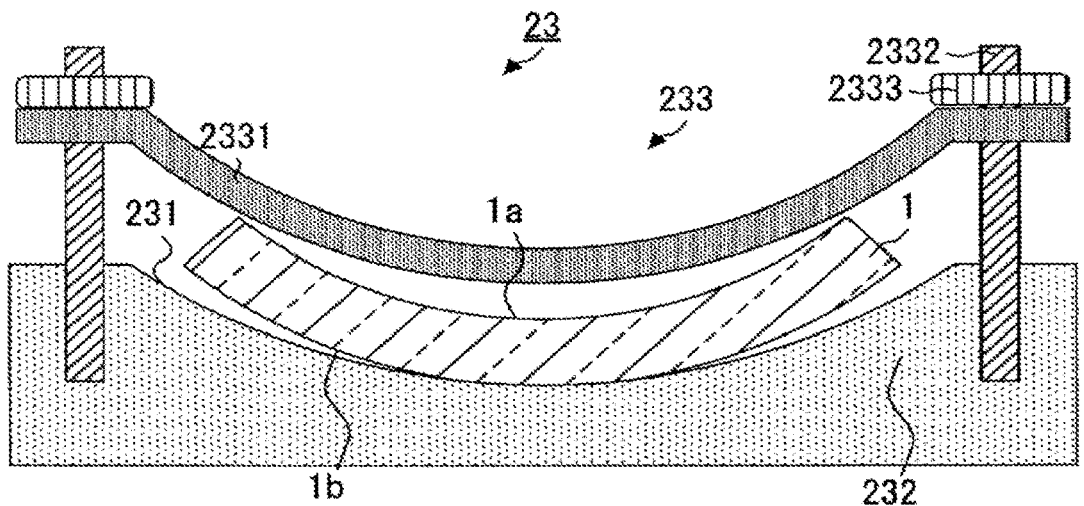
FIG. 3A is a sectional schematic diagram of a placing table as one example of the present embodiment.
Figure 3B:
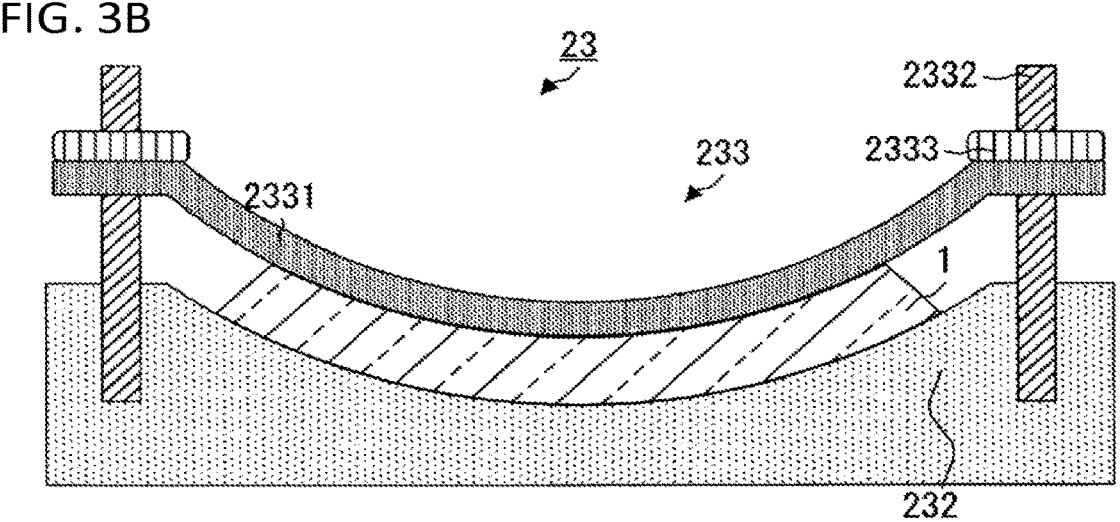
FIG. 3B is a sectional schematic diagram of the placing table where the base material is fixed.
Figure 3C:
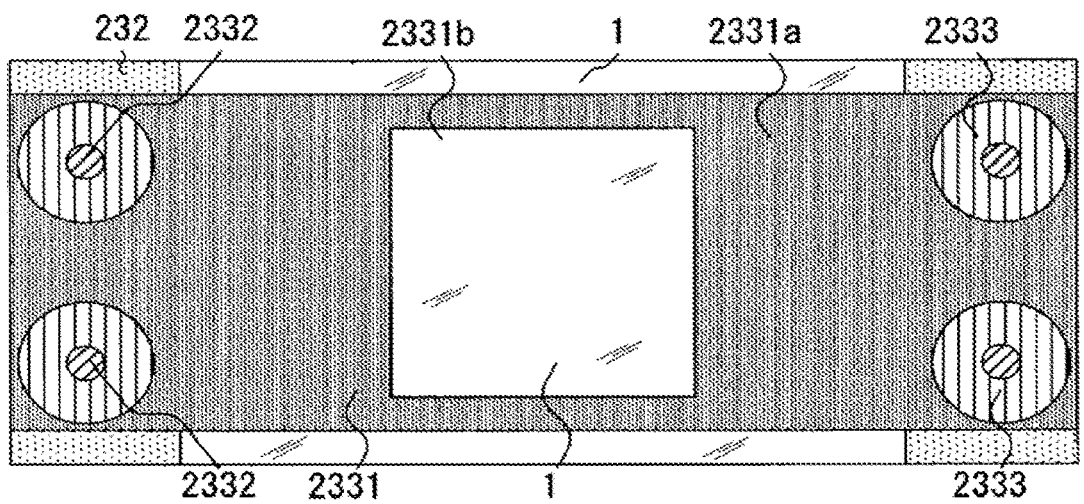
FIG. 3C is a top view of the placing table where the base material is fixed.

The placing table 23 includes a placing surface 231 on which the base material 1 to be evaluated can be placed, a pedestal 232, and a fixing mechanism 233 (see FIG. 3A to FIG. 3C).

The placing surface 231 has a surface shape which can give a desired shape for evaluation to the base material 1 to be evaluated, whereby the base material 1 having a given desired shape for evaluation is fixed to the placing surface 231 with the use of the fixing mechanism 233.

Figure 2A:
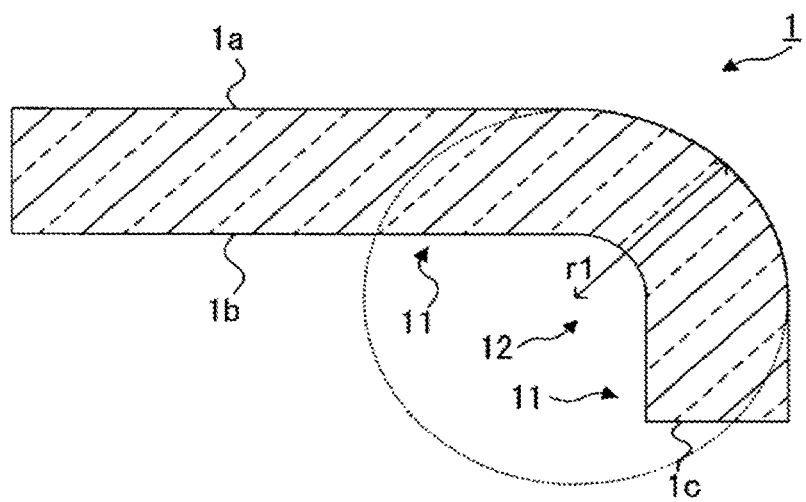
FIG. 2A and FIG. 2B are sectional schematic diagrams of a bent plate (a glass base material including a bent portion), where
Figure 2B:
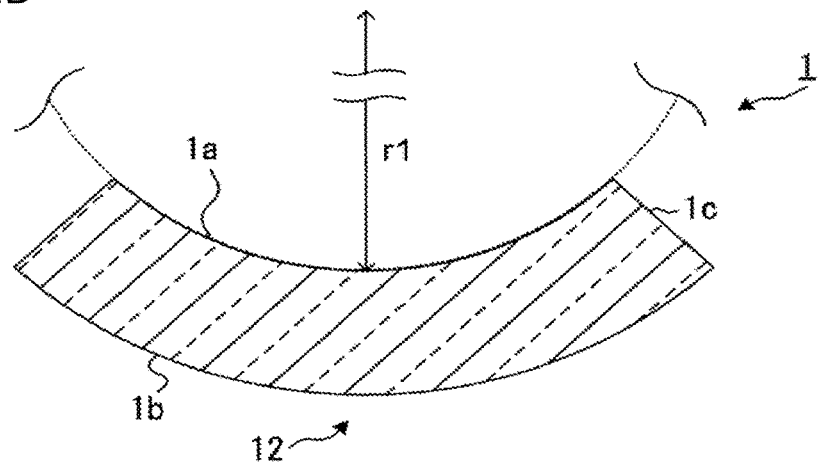

The base material 1 includes a first main surface 1a, a second main surface 1b, and an end surface 1c, and has the shape including at least one bent portion 12, as shown in FIG. 2A and FIG. 2B. Examples of the shape of the base material 1 include a shape including the bent portion 12 and flat portions 11 as shown in FIG. 2A, and a shape having the bent portion 12 over the entire base material 1 as shown in FIG. 2B; however, the shape is not limited particularly as long as the base material 1 includes a bent portion 12.

The bent portion 12 is illustrated so as to have a curvature radius of r1, but another bent portion 12 having a different curvature radius of r1' may be provided, or another bent portion 12 having a curvature radius continuously varying from r1 to r1' may be provided. Here, assuming that the second main surface 1b is a surface with which the placing surface 231 of the pedestal 232 is brought into contact as described later, the curvature radius of the bent portion 12 is a curvature radius with respect to the first main surface 1a.

In the present description, a "flat portion" means a portion having an average curvature radius of more than 5,000 mm, and a "bent portion" means a portion having an average curvature radius of 5,000 or less.

The fixing mechanism 233 may sandwich the base material 1, or supply a negative pressure to the base material 1, and is not limited particularly as long as the fixing mechanism 233 can fix the base material 1.

FIG. 3A is a sectional schematic diagram of the placing table 23 as one example of the present embodiment. When using a mechanism configured to sandwich the base material 1 as the fixing mechanism 233, the device as shown in FIG. 3A can be used. The fixing mechanism 233 in the present embodiment includes a first jig 2331 disposed on the first main surface side of the base material 1, the pedestal 232 used as a second jig disposed on the second main surface side of the base material 1, and connecting members (screws 2332 and nuts 2333). The first jig 2331 includes through-holes through which the screws 2332 can pass.

In fixing the base material 1 in the present embodiment, the base material 1 is placed on the pedestal 232 used as the second jig, the first jig 2331 is further placed on the base material 1 such that the screws 2332 pass through the through-holes, and onto the screws 2332 having their one ends fixed to the pedestal 232, the nuts 2333 are screwed from the other ends of the screws 2332. Thus, the base material 1 is sandwiched to be fixed by the first jig 2331 and the pedestal 232 used as the second jig. At this time, tightening the nuts 2333 fixes the base material 1 while deforming the base material 1 from the initial shape into the shape for evaluation.

It is preferable that a curvature R1 should be higher than a curvature R2, where R1 is the curvature relating to the curvature radius r1 in the base material 1 in the initial shape and R2 is the curvature of the bent portion 12 of the base material 1 deformed in the shape for evaluation.

At this time, it is preferable to deform the bent portion 12 into the shape for evaluation having a curvature R2 by bringing the base material 1 including the bent portion 12 having a curvature R1 in the initial shape into contact with the placing surface 231 and using the fixing mechanism 233.

The curvature R1 of the bent portion of the base material 1 in the initial shape is not particularly limited, and is preferably $0.2 \text{ m}^{-1}$ or more and $100 \text{ m}^{-1}$ or less (100 mm or more and 5000 mm or less in terms of a curvature radius r1). This is because high designability can be obtained as a bent plate. The curvature R1 is more preferably $0.5 \text{ m}^{-1}$ or more and $80 \text{ m}^{-1}$ or less, and still more preferably $0.8 \text{ m}^{-1}$ or more and $50 \text{ m}^{-1}$ or less.

The curvature R2 of the bent portion of the base material 1 in the shape for evaluation is preferably $0 \text{ m}^{-1}$ or more and $2 \text{ m}^{-1}$ or less. This is because uniformity in tests or evaluations can be improved. The curvature R2 is more preferably $0 \text{ m}^{-1}$ or more and $1 \text{ m}^{-1}$ or less, and still more preferably $0 \text{ m}^{-1}$ or more and $0.3 \text{ m}^{-1}$ or less.

When deforming the base material 1 by the connecting members (the screws 2332 and the nuts 2333), the clamping pressure may be controlled with the use of a torque wrench or the like.

Glass including a bent portion (hereinafter, described as bent glass) is preferably used as the base material 1 to be evaluated with the use of a bent glass evaluation apparatus in the present invention such as a wear resistance evaluation apparatus. When evaluations are made on a bent glass in conventional evaluation methods and using conventional evaluation apparatuses that were used for the evaluations using leather or the like, an abrading head cannot be brought into contact uniformly with the evaluation surfaces in the case of wear resistance evaluations, because the glass itself possesses high stiffness and low flexibility. For this reason, the following situation occurs: evaluation conditions vary even among evaluation sections in a surface of the bent glass, which leads to the result having large variation in evaluation. The curvatures of bent portions of bent glass can be changed with the use of the bent glass evaluation apparatus in the present invention, resulting in the achievement of evaluations made on the almost same evaluation conditions among evaluation sections, whereby a result having small variation in evaluation can be obtained.

FIG. 3B is a sectional schematic diagram in which the base material 1 is fixed with the use of the placing table shown in FIG. 3A. It is preferable that the second main surface 1b of the base material 1 should conform to the placing surface 231 of the pedestal 232 as shown in FIG. 3B. This allows the second main surface 1b of the base material 1 to be fixed firmly, whereby evaluations can be made easily with precision. In addition, it is more preferable that the first main surface 1a of the base material 1 should conform to the shape of the contact surface of the first jig 2331. This allows also the first main surface 1a of the base material 1 to be fixed, whereby evaluations can be made with high precision.

It is preferable that the following relationship is satisfied: |r3−r2|=t, where r3 is the curvature radius of a bent portion having a curvature R3 in the placing surface 231, r2 is the curvature radius of the corresponding bent portion having a curvature R2 in the deformed base material in the shape for evaluation, and t is the thickness of the base material.

Thus, provided that the contact surface between the placed base material 1 and the placing surface 231 is defined as a second main surface 1b, the placing surface 231 and the second main surface 1b of the base material 1 can be brought into contact with each other over a wide range, which allows the base material 1 to be supported with stability. Thus, the contact pressure of the abrading head 241 on the base material 1 can be made uniform in a wear resistance evaluation, whereby the evaluation can be made with precision.

FIG. 3C is a top view of the placing table shown in FIG. 3B. The first jig 2331 includes a main body 2331a and an opening portion 2331b. Thus, the first main surface 1a of the base material 1 is exposed, so that it is possible to make an evaluation of the first main surface while deforming the base material into the shape for evaluation.

Materials for the first jig 2331, the second jig, and the pedestal 232 are not limited particularly. Examples of the materials include metals, resins, and ceramics. Resins such as rubber and urethane may be provided only on the sections with which the base material 1 is brought into contact. Thus, occurrence of scratches on the base material 1 can be reduced, and firm fixing can be achieved.

Figure 4A:
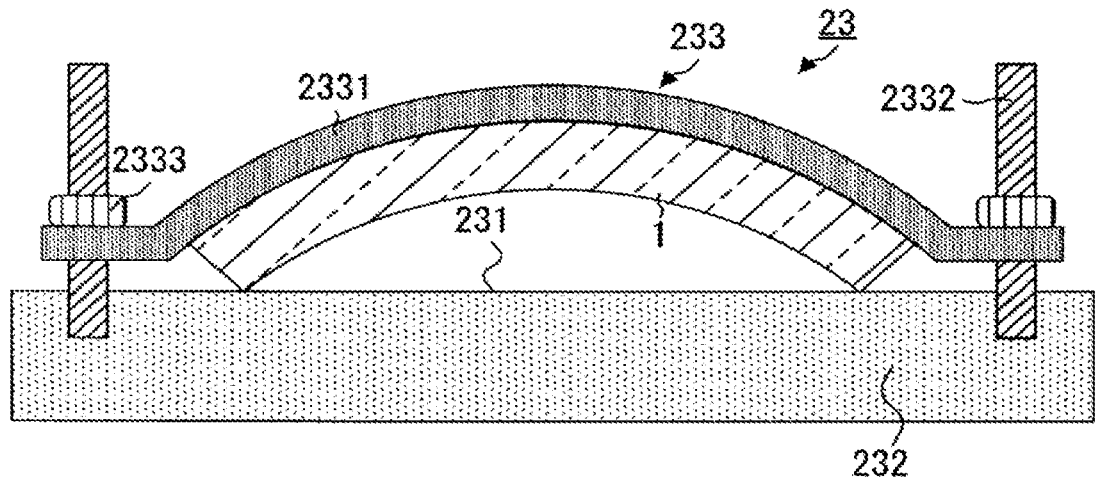
FIG. 4A and FIG. 4B are sectional schematic diagrams of a placing table as another embodiment.
Figure 4B:
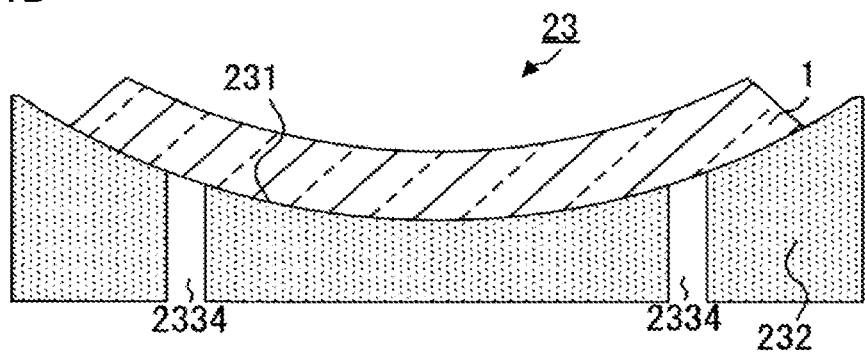

The placing table 23 may have such a shape that either of the first jig 2331 or the pedestal 232 used as the second jig has a shape capable of being contact with the base material 1 as shown in FIG. 4A. In addition, the placing table 23 may include vacuum holes 2334 used as the fixing mechanism 233 that are provided to the pedestal 232 as shown in FIG. 4B so as to achieve suction fixing. In this configuration, the first jig 2331 may be omitted. Also in this case, it is preferable that the following relationship should be satisfied: |r3−r2|=t, where r3 is the curvature radius of a bent portion having a curvature R3 in the placing surface 231, r2 is the curvature radius of the corresponding bent portion having a curvature R2 in the deformed base material in the shape for evaluation, and t is the thickness of the base material.

[Wear Resistance Evaluation Method]

A method for evaluating a base material with the use of the above-described wear resistance evaluation apparatus is as follows. In the method for evaluating a base material in the present invention, the base material 1 including the bent portion 12, and including the first main surface 1a, the second main surface 1b, and the end surface, is deformed to change the curvature of the bent portion 12, and an evaluation is made on the first main surface 1a of the base material 1.

It is preferable that a curvature R1 should be larger than a curvature R2, where, in deforming the base material 1, R1 is the curvature of the bent portion of the base material 1 in the initial shape and R2 is the curvature of the bent portion 12 of the base material 1 deformed in the shape for evaluation.

In the present embodiment, because the base material including the bent portion having the curvature R1 in the initial shape can be deformed into the shape for evaluation so as to have the curvature R2 that is lower than the curvature R1, test methods or measurement methods used for the evaluations of flat base materials are easy to be used, and thus, the evaluations can be made uniformly in quality with precision.

The base material may be deformed by sandwiching the first main surface 1a of the base material 1 and the second main surface 1b of the base material 1, or by supplying a negative pressure to the second main surface 1b, and the deformation of the base material is not limited particularly as long as a mechanism that can deform the base material 1 is provided. It is preferable that a mechanism that can deform the base material 1 and fix it as it is should be provided.

It is preferable that, in deforming the base material, a difference should be given between a pressure P1 (Pa) on the first main surface 1a of the base material 1 and a pressure P2 (Pa) on the second main surface 2b of the base material 1, and it is preferable that the pressure P1 should be larger than the pressure P2.

In the present embodiment, the pressure difference allows the base material 1 to be easily deformed into the shape for evaluation.

As a method for giving a pressure difference between the first main surface 1a of the base material 1 and the second main surface 1b of the base material 1, it is preferable to place the second main surface 1b on the pedestal 232, and supply a negative pressure to the second main surface 1b side.

In the present embodiment, providing only equipment capable of supplying a negative pressure only to the second main surface 1b side of the base material 1 is sufficient, which allows the base material to be easily deformed into the shape for evaluation.

As one example of a base material evaluation, a wear resistance evaluation is made on the base material 1 in the shape for evaluation with the use of the wear resistance evaluation apparatus shown in FIG. 1. At this time, it is preferable that the evaluation should be made on the first main surface 1a of the base material 1.

In addition, a spot or a range on the first main surface 1a of the base material 1 on which an evaluation is to be made may be marked for clarification. By doing this, even when the base material 1 is removed from the pedestal 232 for the purpose of measurement or the like in the middle of the evaluation, the base material 1 can be fixed at the initial position again, and the evaluation can be started again.

A method for evaluating wear resistance with the use of the wear resistance evaluation apparatus 2 in the process of the base material evaluation is as follows.

At first, the base material 1 to be evaluated is prepared, and then, the base material 1 is deformed on the pedestal 232 from the initial shape into the shape for evaluation, and fixed to the pedestal 232. The pedestal 232 to which the base material 1 is fixed is connected to the horizontal reciprocating device 22 of the wear resistance evaluation apparatus 2.

Then, the friction jig 24 is attached to the wear resistance evaluation apparatus 2. A material such as an eraser or calico is worked to have a desired shape to make the abrading head 241, and the abrading head 241 is attached to the fixing tool 242, and the fixing tool 242 thus made is attached to one end of the regulating rod 243. The regulating rod 243 is adjusted so as to have a desired distance kept between the first main surface 1a of the base material 1 and the abrading head 241.

The size of the abrading head 241 is not limited particularly, and may be adjusted depending on an evaluation area, and the size can be chosen as appropriate among a circle having a diameter of 10 mm, a rectangle having a length of 20 mm and a width of 10 mm when seen from a top view, and the like. In addition, during a wear resistance evaluation, the abrading head 241 may be replaced. This is because the abrading head 241 could deteriorate by the contact with the base material 1, and the abrading head 241 thus needs to be replaced to make an evaluation with precision.

A weight 244 for evaluation may be provided to the wear resistance evaluation apparatus 2 so as to be placed from the other end side of the regulating rod 243 depending on wear resistance evaluation conditions. A plurality of weights for evaluation may be used so as to meet the evaluation conditions. The evaluation conditions are not limited particularly, and the mass of the weight for evaluation is preferably 0.5 kg to 5 kg.

In addition, it is preferable that the tilt of the arm 252 should be adjusted with the use of a level regulating weight 245 of a level adjusting rod 246 in advance, and then, the weight 244 for evaluation should be placed.

As described above, the abrading head 241 is brought into contact with the first main surface 1a of the base material 1 fixed to the pedestal 232 so as to put a desired load thereon, and then, the base material 1 becomes the state ready for evaluation.

Here, the speed is adjusted with the use of a speed adjusting switch so that an evaluation can be made on the base material 1 moved at a desired speed with respect to the abrading head 241. In addition, the number of times of sliding movement is set with the use of the counter 28 so that the abrading head 241 and the base material 1 can be stopped at a desired number of times of sliding movement. An evaluation is started by turning on the power switch 27 in this state.

By making a wear resistance evaluation under desired conditions as described above, an evaluation of wear resistance can be made on the first main surface 1a of the base material 1 uniformly in quality with precision.

A method for making an evaluation of wear resistance of the base material 1 is not limited particularly, and examples thereof include a visual evaluation, microscopic observation, and tactile impression, and a liquid interface evaluation by which an evaluation of so-called wettability can be made is preferable considering that a quantitative evaluation can be easily made. Because in making an evaluation of a base material including a bent portion in an initial shape, the bent portion is deformed into a shape for evaluation, an error generated from a deviation of a liquid drop position can be minimized, and measurement can be made uniformly in quality with precision.

Figure 5:
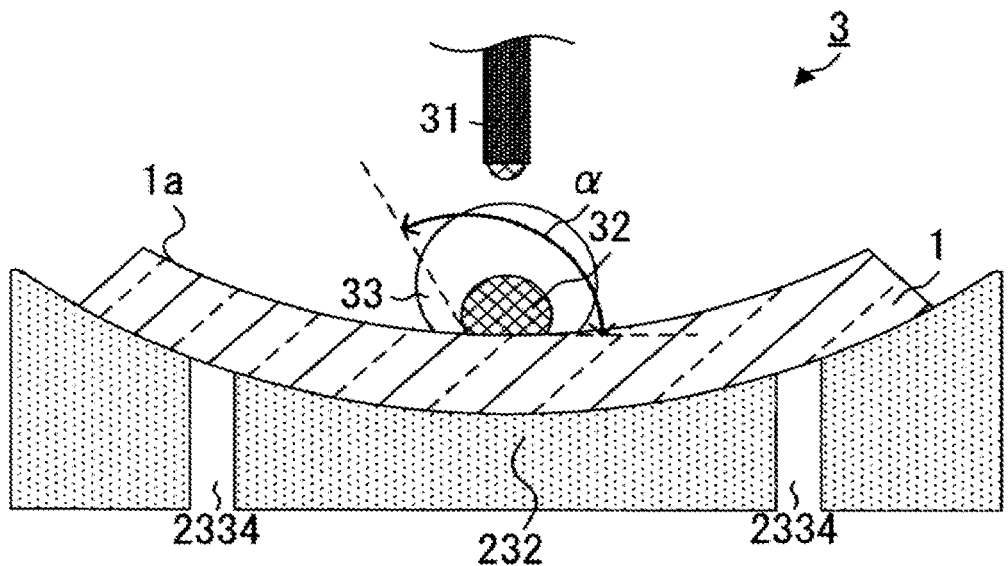
FIG. 5 is a diagram for explaining a liquid interface evaluation.

FIG. 5 is a side view in a liquid interface evaluation. A liquid interface evaluation apparatus is prepared in a state where the base material 1 that has been subjected to the wear resistance evaluation is fixed to the pedestal 232.

A liquid interface evaluation apparatus 3 includes a syringe 31 containing a test liquid and a camera 33, and drops the test liquid from the syringe 31 onto the first main surface 1a of the base material 1 to form a liquid droplet 32. The liquid droplet 32 is observed with the use of the camera 33, and an angle α formed by the liquid droplet 32 and the first main surface 1a is determined. By comparing the angle before the wear resistance evaluation with the angle after the wear resistance evaluation, an evaluation of the wear resistance of the base material 1 can be made in an indirect manner. While the angle α is greatly influenced by the shape of the base material 1, the influence on the angle α can be minimized because the first main surface 1a of the base material 1 can be flattened by the above-described wear resistance evaluation method, whereby variation in evaluation can be reduced.

As the test liquid, pure water, organic liquids such as glycerin, and the like can be used depending on purposes. A value correction may be added to the angle α of the measurement result depending on the curvature of the first main surface 1a of the base material 1.

(Evaluation)

Evaluations are not limited to the above-described wear resistance evaluation and liquid interface evaluation. For example, in making chemical resistance evaluations, test chemical liquids can be held stably on base materials, whereby the evaluations can be made with precision. In addition, in making optical characteristic evaluations, optical influences caused by bends of base materials can be minimized, whereby the evaluations can be made with precision. In making surface profile evaluations, shape distortion caused by bends of base materials can be reduced, whereby the surface profile can be measured and evaluated with precision.

The wear resistance evaluation is not limited to a scratch resistance test with the use of an abrading head, and a pencil hardness test, a crosscut peeling test, or the like can be carried out as a wear resistance evaluation.

As the optical characteristic evaluation, transmittance measurement, reflectance measurement, haze measurement, chromaticity measurement, optical concentration measurement, resolution index measurement, glare index measurement, reflection image diffuseness index measurement, or the like can be carried out. A measurement apparatus capable of carrying out these optical characteristic evaluations includes, for example, a light generating portion for generating measurement light, and a light receiving portion for receiving information light that defines the measurement light to which information that is obtained after the measurement light is brought into contact with an evaluation subject is added. In an optical characteristic evaluation, the amount and quality of information light to which information is added is important. In a case where an evaluation is made on a base material including a bent portion, it could sometimes happen that the distance between the light generating portion and the base material does not become constant, or that external light enters a gap between the light generating portion or the light receiving portion and the base material because of the bent portion of the base material, so that variation could occur in the information light, or the information light could lack precision.

Since the base material including the bent portion can be flattened in the above-described evaluation method and evaluation apparatus, the distance between the light generating portion and the base material can be made to fall within a constant range, and further a gap with the light generating portion or the light receiving portion is not made. This can prevent external light from entering, so that the optical characteristic evaluation can be made with precision.

Modified Example

The present invention is not limited to the embodiments described above, and various modifications and design changes may be made without departing from the spirit and scope of the present invention, and in addition, the specific steps and structures in implementing the present invention may be replaced with other ones in a range in which objectives of the present invention can be achieved.

(Base Material)

Examples of the base material include glass, silicon, and the like. Examples of the glass include inorganic glass and organic glass. Examples of the organic glass include polycarbonate, polymethylmethacrylate, and the like.

It is preferable that at least one main surface, when inorganic glass is used as the material of a cover member, should be subjected to a strengthening treatment. This allows the cover member to have required mechanical endurance and scratch resistance. Examples of the strengthening treatment include a physical strengthening treatment and a chemical strengthening treatment, and the chemical strengthening treatment is preferable because the strengthening treatment can be subjected to a relatively thin glass.

The base material preferably has a Young's modulus of 50 GPa or more, and more preferably has a Young's modulus of 60 GPa or more, and still more preferably has a Young's modulus of 70 GPa or more. This is because when the base material including a bent portion is deformed to make a non-destructive evaluation on its first main surface $1a$, the base material can be deformed into the shape for evaluation without being broken, and can also restore original shape even after the evaluation. The upper limit of the Young's modulus of the base material is not limited particularly, and as the upper limit, the Young's modulus is preferably, for example, 200 GPa or less, and more preferably 150 GPa or less from the viewpoint of evaluation. The Young's modulus of the base material can be determined by measuring a test piece having a length of 20 mm, a width of 20 mm, and a thickness of 10 mm based on an ultrasonic method in accordance with JIS R 1602 (1995).

The base material preferably has a Vickers hardness Hv of 400 or more, and more preferably has a Vickers hardness Hv of 500 or more. This is because when, for example, a first jig is used in deforming the base material, the base material can be prevented from occurring a scratch or breakage which may be caused by being brought into contact with the first jig. This can prevent a scratch or the like other than the one made in an evaluation of the base material, which can improve the precision in evaluation of the base material. The upper limit of the Vickers hardness of the base material is not limited particularly, and as the upper limit, the Vickers hardness is preferably, for example, 1200 or less, and more preferably 1000 or less. The Vickers hardness of the base material in the present embodiment can be measured by a Vickers hardness test, for example, described in JIS Z 2244 (2009).

(Processing)

At least one main surface of the base material may be subjected to grinding/polishing processing.

A hole may be formed in at least one portion of the base material. The hole may be formed to penetrate the base material or may be formed not to penetrate the base material.

The end surface of the base material may be subjected to a treatment such as chamfering processing. In the case of using glass as the base material, it is preferable to carry out processing that is generally called R chamfering or C chamfering by mechanical grinding, and the processing such as etching may be carried out, and is not limited particularly.

Processes for forming a variety of surface treated layers or printed layers may be carried out at required sites on the base material. Examples of the surface treated layers include an antireflection treated layer and an antifouling treated layer, which may be used in combination.

The present application is based on Japanese Patent Application No. 2016-229439 filed on Nov. 25, 2016, the contents of which are incorporated herein by reference.

1 Base material
$1a$ First main surface
$1b$ Second main surface
$1c$ End surface
11 Flat portion
12 Bent portion
2 Wear resistance evaluation apparatus
21 Body frame
22 Horizontal reciprocating device
23 Placing table
24 Friction jig
25 Supporting member
26 Speed adjusting switch
27 Power switch
28 Counter
3 Liquid interface evaluation apparatus
31 Syringe
32 Liquid droplet
33 Camera

The invention claimed is:

1. A method for preparing a curved glass object or curved silicon object for measurement of a physical, chemical or optical property of a surface of the a curved glass object or curved silicon object, comprising:
   placing the a curved glass object or curved silicon object on a pedestal;
   deforming the curved glass object or curved silicon object on the pedestal from a curvature R1 to a curvature R2, wherein R2 is less than R1; and
   measuring the physical, chemical or optical property of the curved glass object or curved silicon object on the deformed surface thereof while the deformed curved glass object or deformed curved silicon object is on the pedestal;
   wherein the curved glass object or curved silicon object has a first main surface, a second main surface, and an end surface,
   the second main surface contacts the pedestal, and
   the measurement of the physical, chemical or optical property is on the first main surface.

2. The method according to claim 1, wherein deforming the curved glass object or curved silicon object comprises:
   i) applying a pressure P1 on a first main surface side of the a curved glass object or curved silicon object toward the pedestal to deform the curved glass object or curved silicon object to conform to the surface of the pedestal; or
   ii) applying a negative pressure P2 on a second main surface side of the curved glass object or curved silicon object with vacuum drawn through the pedestal to deform the curved glass object or curved silicon object to conform to the surface of the pedestal; or a combination of i) and ii).

3. The method according to claim 2, wherein the following relationship is satisfied:

$$|r3-r2|=t$$

wherein r3 is a curvature radius of the surface of the pedestal to which the deformed curved glass object or curved silicon object conforms, r2 is a curvature radius of the deformed curved glass object or deformed curved silicon object having a curvature R2, and t is a thickness of the curved or bent glass or silicon.

4. The method according to claim 1, wherein in deforming the curved glass object or curved silicon object, the curved glass object or curved silicon object is sandwiched by a jig disposed on a first main surface side of the curved glass object or curved silicon object and the pedestal and the jig is applied to deform the curved glass object or curved silicon object to conform to the surface of the pedestal.

5. The method according to claim 4, wherein the jig comprises an opening portion which exposes the first main surface of the curved glass object or curved silicon object.

6. The method according to claim 4, wherein the first jig and the pedestal are connected with each other by a connecting member.

7. The method according to claim 6, wherein the following relationship is satisfied:

$$|r3-r2|=t$$

wherein r3 is a curvature radius of the surface of the pedestal to which the deformed curved glass object or deformed curved silicon object conforms, r2 is a curvature radius of the deformed curved glass object or deformed curved silicon object having a curvature R2, and t is a thickness of the curved glass object or curved silicon object.

8. The method according to claim 1, wherein the property of the surface to be measured is wear resistance.

9. The method according to claim 1, further comprising, placing a liquid droplet on the surface to be measured, and wherein the property of the surface to be measured is derived from an evaluation of the liquid interface of the droplet.

10. The method according to claim 1, wherein the property of the surface to be measured is an optical characteristic.

11. The method of claim 1 wherein the curved glass object is measured and the glass is an organic or inorganic glass.

12. The method of claim 11, wherein an organic glass is measured and the organic glass is polycarbonate or polymethylmethacrylate.

* * * * *